United States Patent [19]

Starke et al.

[11] Patent Number: 4,840,480
[45] Date of Patent: Jun. 20, 1989

[54] LIGHT CONDUIT ARRANGEMENT FOR MONITORING A PHYSICAL CONDITION OF A STRUCTURAL PART

[75] Inventors: J. Peter Starke, Odenthal; Friedrich K. Levacher, Brauweiler; Helmut Federmann, Berg. Gladbach, all of Fed. Rep. of Germany

[73] Assignee: Philips Kommunikations Industrie A, Hamburg, Fed. Rep. of Germany

[21] Appl. No.: 405,095

[22] Filed: Aug. 4, 1982

[30] Foreign Application Priority Data

Aug. 12, 1981 [DE] Fed. Rep. of Germany ....... 3131870

[51] Int. Cl.⁴ ............................................. G01B 11/16
[52] U.S. Cl. ...................................... 356/32; 356/34; 73/800
[58] Field of Search ..................... 356/32, 34; 250/227; 73/800, 786; 340/550, 555, 564

[56] References Cited

U.S. PATENT DOCUMENTS

| | | | |
|---|---|---|---|
| 3,407,304 | 10/1968 | Kinard et al. | 250/227 |
| 4,173,412 | 11/1979 | Ramsay et al. | 356/73.1 X |
| 4,272,189 | 6/1981 | Bailey et al. | 250/227 |
| 4,399,430 | 8/1983 | Kitchen | 250/227 |
| 4,450,434 | 5/1984 | Nielsen | 250/227 X |

FOREIGN PATENT DOCUMENTS

| | | | |
|---|---|---|---|
| 2937824 | 10/1980 | Fed. Rep. of Germany. | |
| 3015391 | 10/1981 | Fed. Rep. of Germany. | |
| 2036336 | 6/1980 | United Kingdom | 73/800 |
| 2039683 | 8/1980 | United Kingdom | 340/550 |

Primary Examiner—Vincent P. McGraw
Assistant Examiner—S. A. Turner
Attorney, Agent, or Firm—Michael J. Striker

[57] ABSTRACT

A structural element is provided with at least one light conduit which is arranged thereon under a selected mechanical initial stress. In this manner, the deformation or breakage can be detected at loads or deformations which are lower than the breaking loads or deformations of the component parts to be monitored.

4 Claims, 2 Drawing Sheets

LIGHT CONDUIT ARRANGEMENT FOR MONITORING A PHYSICAL CONDITION OF A STRUCTURAL PART

BACKGROUND OF THE INVENTION

The invention relates in general to an arrangement for monitoring or detecting a physical condition such as breakage or elongation of a structural part by means of at least one light conduit, the inlet and outlet portions of which are connectable to a light source and a light receiver, respectively, to monitor its light conductivity.

With increasing complexity of modern constructions, motor vehicles and machines, an increased need is felt for providing means for monitoring the changes of physical conditions of certain structural elements, whereby the monitoring should be simple, fast and performable without disassembly of the whole structure. Another field of application for such monitoring means is in protection against break-ins and theft.

From German publication No. 2,937,824 a method is known for detecting breakage of component parts which are under tensile load. In this known method, light-conductive fibers are mounted or embedded in the zones of the component part which are susceptible to breakage, whereby the light conductivity of the light-conductive fibers is continuously or intermittently checked.

In this publication, however, there is no suggestion how to adjust the employed light conductors to different qualities of the component parts to be monitored.

In German patent application No. 3,015,391 it has also been proposed to reinforce the light-conductive fibers and connect the same to the structural part by means of elastic envelopes.

This embodiment is suitable for structural parts whose critical deformation is greater than the breaking elongation of the applied light conductors; only in this case is it assured that the light conductors rupture at a definite critical elongation of the structural element, thus yielding the desired indication that the structural part is overloaded.

SUMMARY OF THE INVENTION

A general object of the present invention is to overcome the disadvantages of prior-art arrangements of this kind.

More particularly, it is an object of the invention to provide an arrangement which makes it possible to monitor the physical condition of structural parts, even in those cases where the breaking elongation of the construction part to be monitored is less than the breaking elongation of the employed light conduits.

In keeping with this object, and others which will become apparent hereafter, one feature of the invention resides in the provision of at least one conduit which is arranged on the structural part to be monitored at a predetermined mechanical stress relative to the latter.

The advantage of the solution according to this invention is particularly in the fact that the prestress of the light conduit is selectable such that a certain relatively minor additional load is sufficient for causing breakage of the fibers.

In a further elaboration of this invention, there are employed several light conductors, each having a different mechanical prestress relative to the zone of the component part to be monitored. This embodiment makes it possible to determine the magnitude of the applied load or of the resulting elongation.

In a further embodiment of this invention a plurality of light conduits are arranged at a definite mechanical initial stress on the zone of the structural part to be monitored and form with each other a coordinate-like pattern.

This embodiment of the invention has the advantage that, when employed on zones of the structural parts which have large area, it is possible to pinpoint the location of the breaking load, or to determine the starting point of the breakage.

In still another embodiment of this invention, the structural part has a tubular configuration and one or more light conduits are coiled under a definite mechanical prestress on or in the tubular section of the construction part.

This embodiment has the advantage that the desired mechanical prestress can be accomplished in a very simple manner during the winding operation, by breaking the wound off reel, which operation can be performed very precisely.

Additional advantages of this invention will be appreciated particularly in the case of high-voltage component parts such as overhead transmission lines or insulators or, if it is desired to monitor pressurized containers or air, insulating oil or insulating gases, because the invention does not employ electrically conductive connections between the zones to be monitored and the indicating or monitoring side.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
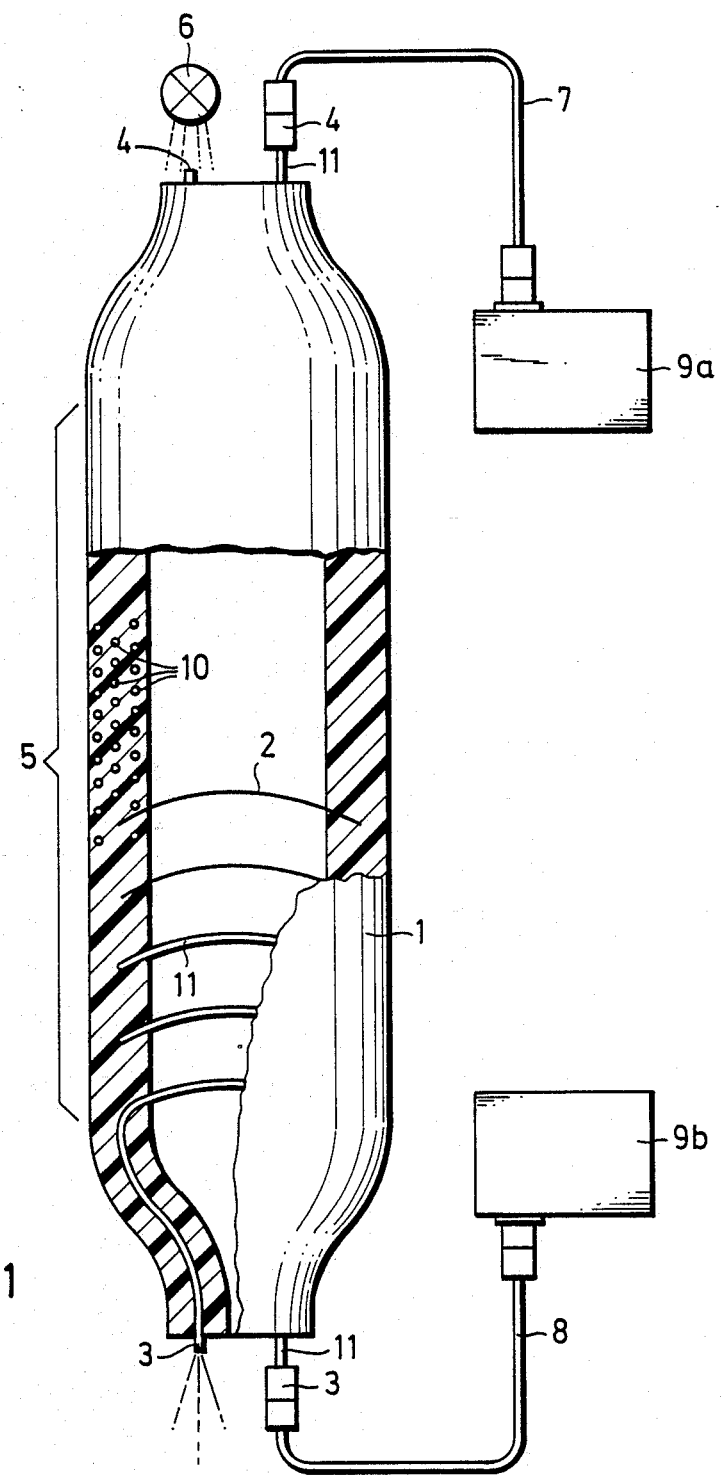
FIG. 1 is a side view, partly in section, of a container incorporating the light-conductive monitoring arrangement according to this invention.

FIG. 1 illustrates a tubular or bottle-shaped pressure container 1 made for example of a plastic material reinforced by reinforcing fibers 10. Between the coiled layers of the reinforcing fibers there are coiled in the range or zone 5 of the container to be monitored light conduits 2 which preferably are surrounded in an envelope 11 of a plastic material. The inlet and outlet terminal portions 3 and 4 of the light conduits 2 project from the end walls of the container 1 and are connectable to means for monitoring the light conductivity as will be described below. Preferably, the light conduits 2 are wound off during the manufacture of the container 1 from a reel which during the winding operation is braked to such an extent as to produce the desired initial stress of the light conduits 2 relative to the body of container 1. The means for monitoring the light conductivity of light conductors 2 is indicated by a light source 6 which emits light to the inlet terminal 4 of one light conduit. The outlet terminal portion 3 of the light conduit transmits light so long as the corresponding light conduit is undamaged. An automatic monitoring is indicated by connecting, via light-conductive cables 7 and 8 and corresponding plug-in connectors, the inlet and outlet terminal portions 3 and 4 of a light conduit to a light source 9a at one end and to a light receiver 9b, at the other end.

Figure 2:
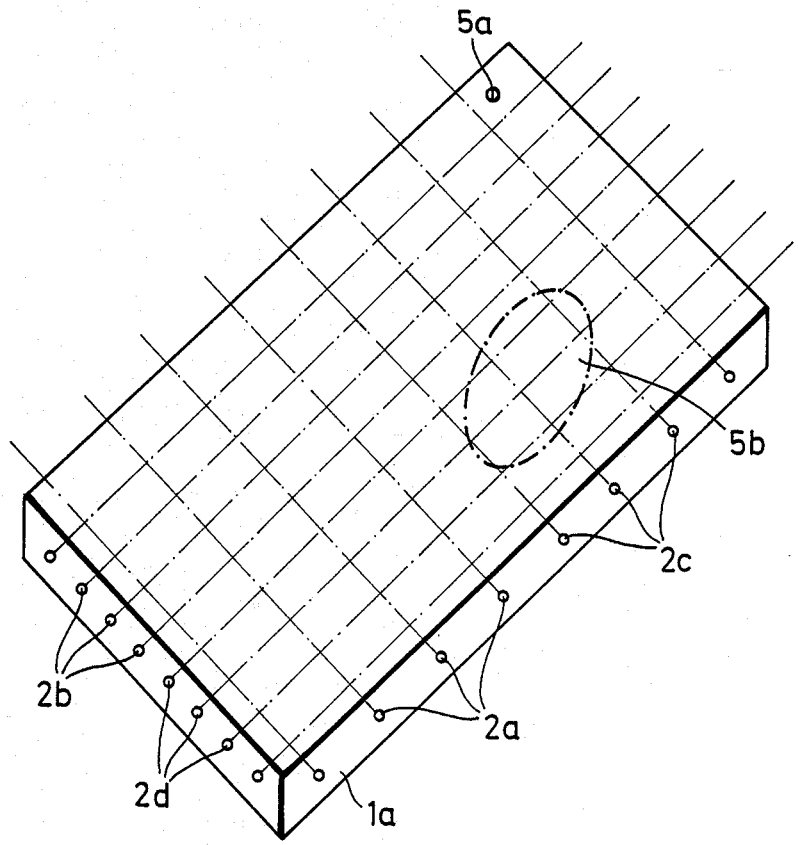
FIG. 2 is a perspective view of a component part with an array of light conduits arranged according to this invention in a coordinate-like pattern.

FIG. 2 depicts a planar component part 1a the major surface 5a of which represents a zone which is to be monitored. In this embodiment, a first group of parallel light conduits 2b and 2d extends at regular intervals in the direction of the longer side of the plate 1a, and another group of light conduits 2a and 2c extend at regular intervals at right angles to the first group in the direction of the shorter side of the plate. The resulting coordinate-like pattern of light conduits 2a–2d has the effect that, in the event of a zone 5b for example becoming overloaded and light conduits 2b and 2d passing through this zone undergoing a rupture, then due to the absence of light passing through these conduits the exact location of the zone 5b on the plate 1a can be determined. This coordinate arrangement of light conduits is of particular advantage when the component parts to be monitored have a very large area, for example brick walls, fences, or bridge-supporting structures. The possibility of pinpointing the location of overload permits a prompt application of measures for preventing the propagation of the load and of the resulting damage. This information is also important in designing and developing improved constructions of such component parts. By selecting a suitable prestress of the light conduits it is possible to detect even very small loads and minute deformations of the monitored part which are still below the breaking load or deformation of the latter.

It will be understood that each of the elements described above, or two or more together, may also find a useful application in other types of constructions differing from the types described above.

While the invention has been illustrated and described as embodied in specific examples of this invention, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A light conduit arrangement for monitoring physical conditions, such as breakage or deformation, of a structural part, comprising at least one light conduit whose breaking elongation is greater than that of the structural part, the light conduit having its terminal portions connectable respectively to a light source and a light receiver, an intermediate portion of the light conduit being secured to the structural part under an initial mechanical stress relative to the structural part, and the initial mechanical stress being selected such that the resulting breaking elongation of the prestressed intermediate portion is less than that of the structural part.

2. A light conduit arrangement as defined in claim 1, comprising a plurality of light conduits secured to the structural part to be monitored at different mechanical initial stresses.

3. A light conduit arrangement as defined in claim 1, comprising a plurality of light conduits arranged at a definite mechanical prestress on or in the structural part, said light conduits intersecting each other to form a coordinate-like pattern.

4. A light conduit arrangement as defined in claim 1, wherein said structural part has a tubular configuration and at least one light conduit is coiled under a definite mechanical prestress on said structural part.

* * * * *